Figure 1:
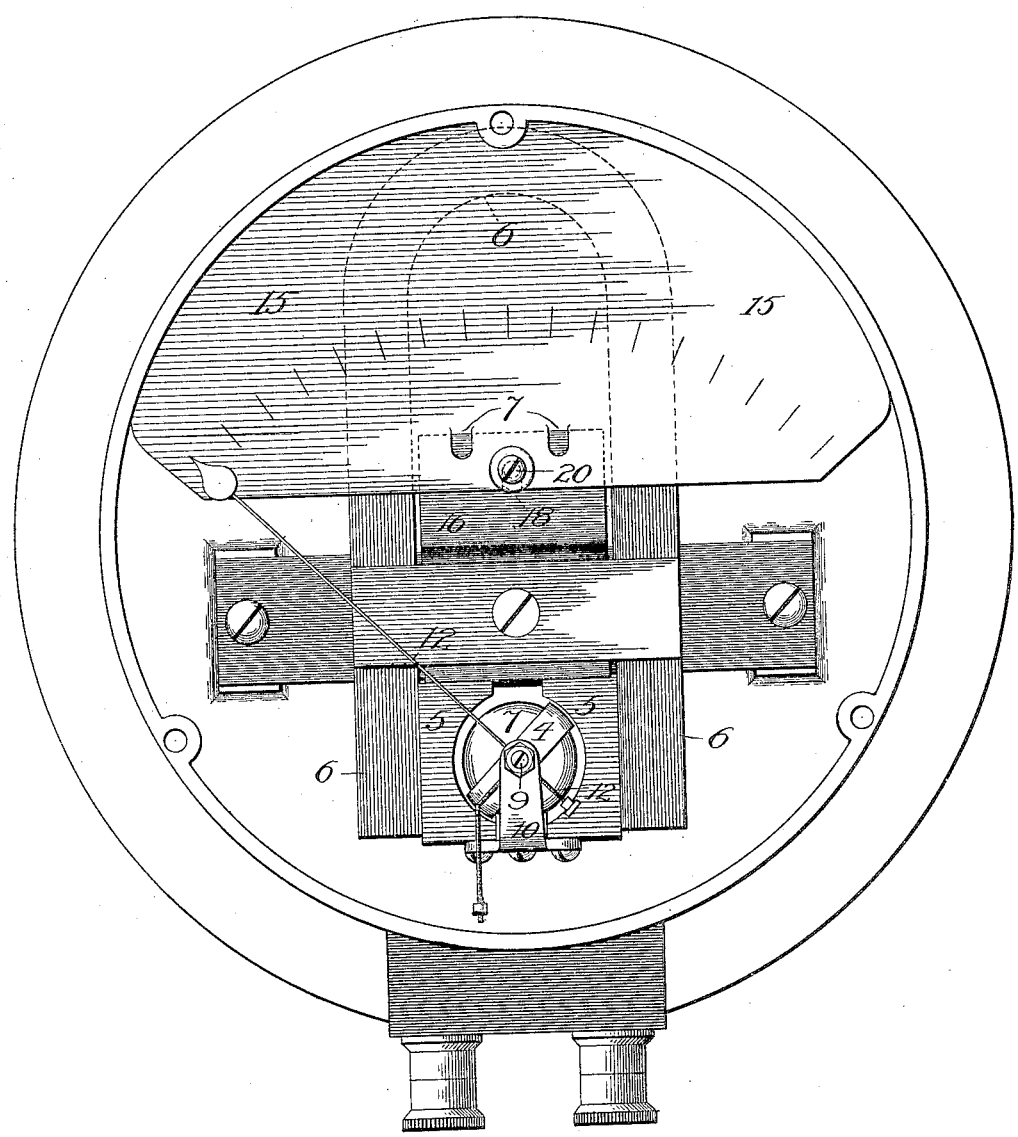

No. 817,869. PATENTED APR. 17, 1906.
J. PATRICK.
ELECTRICAL MEASURING INSTRUMENT.
APPLICATION FILED AUG. 3, 1905.

2 SHEETS—SHEET 1.

Witnesses:

Inventor:
Joshua Patrick,
By Barton & Sanner
Attys.

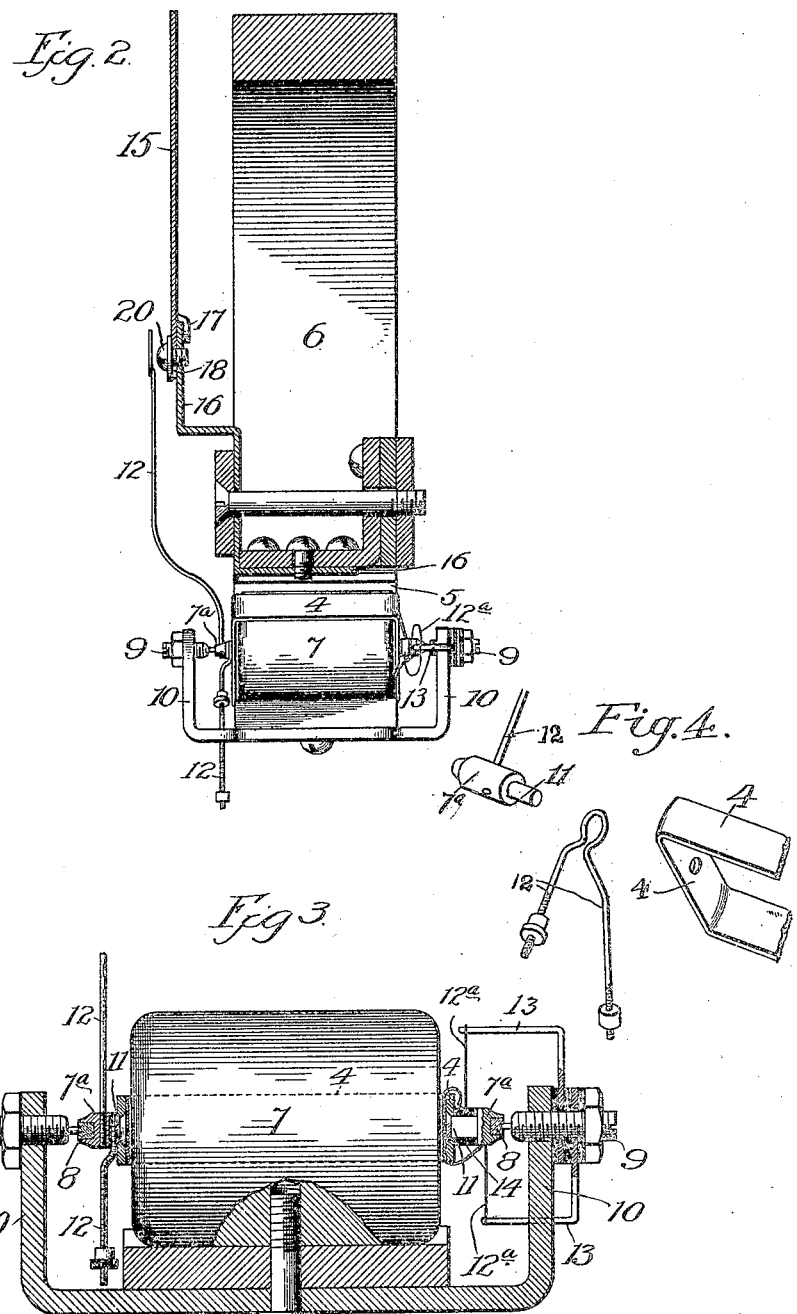

UNITED STATES PATENT OFFICE.

JOSHUA PATRICK, OF CHICAGO, ILLINOIS, ASSIGNOR TO INTERNATIONAL ELECTRIC METER COMPANY, OF CHICAGO, ILLINOIS, A CORPORATION OF ILLINOIS.

ELECTRICAL MEASURING INSTRUMENT.

No. 817,869.     Specification of Letters Patent.     Patented April 17, 1906.

Application filed August 3, 1905. Serial No. 272,470.

*To all whom it may concern:*

Be it known that I, JOSHUA PATRICK, a citizen of the United States, residing at Chicago, in the county of Cook and State of Illinois, have invented a certain new and useful Improvement in Electrical Measuring Instruments, of which the following is a full, clear, concise, and exact description.

My invention relates to an electrical measuring instrument of the type in which a coil of wire adapted to carry the current to be measured or a definite fraction of such current is arranged to move in the field of force of a magnet, the motion of the coil being opposed by any suitable means, such as a weight or spring, so that the deflection of the coil from its normal position will be greater or less, according to the strength of the current.

This invention is concerned particularly with an improved construction of the parts making up the moving system with a view to greater strength and rigidity of the parts, simplicity and cheapness of construction, ease of assembly and adjustment, and protection against injury.

An instrument constructed in accordance with my invention is illustrated in the accompanying drawings, in which—

Figure 1 is a front view of the instrument with the cover removed. Fig. 2 is a vertical sectional view thereof. Fig. 3 is a detail view of the moving system, and Fig. 4 is a detail view showing the manner of attaching the needle and counterbalance-arm to the moving system.

The same reference characters are used to designate the same parts wherever they are shown.

The instrument shown in the drawings is of the "gravity" type, in which the rotation of the coil in the magnetic field is opposed by a weighted arm; but the invention is not limited in its application to this type of instrument.

The coil is disposed upon the inside of a coil-frame 4, which is constructed of a diamagnetic metal, such as aluminium. This coil-frame is pivotally mounted in a manner hereinafter to be described, so as to rotate upon its axis in the field of force between the inwardly-curved or concave pole-pieces 5 5 of the permanent magnet 6. A cylindrical core 7, of soft iron, is located within the space inclosed by the coil-frame, so that a substantially annular field is thus provided between the inner faces of the pole-pieces and the core, within which field the coil is free to turn. One of the principal features of this invention relates to the mounting of the coil-frame. It has been usual heretofore to wind the coil upon the outside of the frame and to attach pivot-pieces to the ends of the coil by sticking them to the coil with shellac and further fastening them by binding them in place with thread. The points of the pivot-pins have been sharpened to bear in jewels held in suitable supports. With this construction the accurate centering of the coil and frame is a matter of considerable delicacy and change of adjustment is difficult. Furthermore, in case the pointed ends of the pivots are broken, as frequently happens, they are not easily sharpened, and if the coil is burned out, so that it has to be rewound, the mounting of the pivots must of course be done over again. In accordance with my invention the coil is wound or disposed upon the inside of the coil-frame 4, (being fastened in place by a sticking compound, such as shellac,) and the trunnions 7ª are riveted to the metallic coil-frame itself. Furthermore, I preferably mount the bearing-jewels 8 in the ends of the trunnions and mount the pointed pivot-screws 9 in stationary supports 10, so that the points of said screws will enter the jeweled bearings in the trunnions. This is a simple rigid construction which admits of exact centering of the coil and also permits adjustment of the bearings with great ease by simply screwing the pivot-screws 9 9 toward or from the trunnion-bearings. If the point of a pivot-screw is broken, it may be quickly replaced or sharpened without removing the coil-frame from its position. It will further be observed that in case the coil is burned out or is otherwise defective it may be replaced, or the point of the pivot-screw may be sharpened without in either case removing the trunnions from the coil-frame or disturbing the jewels. When the defective coil has been replaced, the coil-frame may be again exactly centered in the pivot-screws, as before.

Each of the trunnions is constructed with a head or shouldered portion adapted to hold the jewel and with a shank or pin 11, which passes through the coil-frame and has its end "upset" or hammered down to rivet the trunnion to the frame. The weight-arm 12 may conveniently be attached to the coil-frame by having its end bent in a loop and fastened under the head or shoulder of one of the trunnions and bound tightly against the frame by the riveting of said trunnion, the shank of the trunnion passing through said loop. It is evident that the indicator-needle may also be secured to the coil-frame in the same manner, although I prefer to fasten the needle in place by mounting it in a transverse hole through one of the trunnions. In the claims I shall use the term "arm" as meaning any part, such as the indicator-arm or weight-arm, which it may be desired to fasten to the coil-frame.

A further feature of this invention lies in an improved construction by which the coil is protected from being burned out by excessive current. The conductors or copper ribbons 12ª 12ª, which convey the current to and from the terminals of the coil, (carried by the coil-frame,) are very fine, smaller in cross-section than the wire of the coil, so that in the case of the passage of excessive current these fine conductors 12 are instantly fused and in most instances will rupture the circuit before the coil can be materially damaged. The points of attachment of these fine conductors 12ª are so accessible that they may be quickly replaced if burned out. One end of each conductor 12ª is fastened to an insulated support or anchor 13, at which connection is made with the leading-in wire, while the other end is soldered to one of the insulated terminals 14 of the coil, carried by one of the trunnions 7. One of said terminals 14 may be formed by the head of the trunnion itself, while the other terminal is formed by a metallic ring carried upon said trunnion, but insulated therefrom by a suitable bushing and washers.

The scale-plate 15, over which the indicator-needle swings, is preferably mounted upon the bracket 16, carried by the "movement" of the instrument, so that when the movement is taken out of the casing the relative positions of the scale and moving system will not be changed. The scale-plate is preferably provided with two ears 17 17, struck out from the material thereof, which serve to hold it in alinement, and is also provided with a slot 18, through which is passed the screw 20, which binds the plate to the bracket 16.

I claim—

1. In an electrical measuring instrument, the combination with a coil-frame and the coil disposed upon the inside of said frame, of trunnions mounted upon the ends of said coil-frame, bearing-jewels mounted in the ends of said trunnions, supporting-brackets opposite the ends of said coil-frame, and pivot-screws passing through said brackets and having pointed ends entering said jewels and forming bearings upon which said coil-frame may freely turn.

2. In an electrical measuring instrument, the combination with a metal coil-frame and a coil disposed upon the inside of said frame, of trunnions riveted upon the ends of said coil-frame and stationary pivot-screws having pointed ends entering bearings in the end of said trunnions.

3. In an electrical measuring instrument, the combination with a metal coil-frame, of trunnions at the ends of said coil-frame, each trunnion comprising a head or shouldered portion and a shank passing through the coil-frame and upset to form a rivet to fasten the trunnion in place upon the frame, and pivot-bearings for said trunnions.

4. In an electrical measuring instrument, the combination with a metal coil-frame and a coil carried by said frame, of trunnions at the ends of said coil-frame, each trunnion comprising a head or shouldered portion and a shank passing through the coil-frame, and upset to rivet said trunnion upon the frame, an arm having a looped end fastened under the head or shouldered portion of said trunnion, and pivot-bearings for said trunnions.

5. In an electrical measuring instrument, the combination with a coil-frame and a coil disposed upon the inside of said frame, of a trunnion upon the end of said frame, said trunnion comprising a head or shouldered portion and a shank passing through said frame and upset to rivet said trunnion in place, a metallic ring encircling said trunnion, and a bushing and washers of insulating material separating said ring from said trunnion, the ends of the wire of the coil being soldered to said trunnion and to said ring respectively, flexible conductors soldered to said ring and trunnions and a support to which said flexible conductors are anchored.

6. In an electrical measuring instrument, the combination with a coil-frame, of a coil carried thereby and having terminals for said coil moving with said frame, a fixed support, and free flexible conductors of smaller cross-section than the wire of the coil, connected with said terminals respectively and anchored to said support, whereby upon passage of an excessive current said free conductors will be fused to rupture the circuit before the coil is injuriously heated.

7. In an electrical measuring instrument, the combination with a moving coil, of a weighted arm opposing the movement of said coil, and fine flexible conductors connected with the terminals of said coil, to convey current to and from said coil, and a support to which said conductors are anchored, said flexible conductors being adapted to fuse and rupture the circuit upon the passage of current of less strength than that required to injuriously heat said coil.

In witness whereof I hereunto subscribe my name this 28th day of July, A. D. 1905.

JOSHUA PATRICK.

Witnesses:
 De Witt C. Tanner,
 August Benson.